Figure 1:
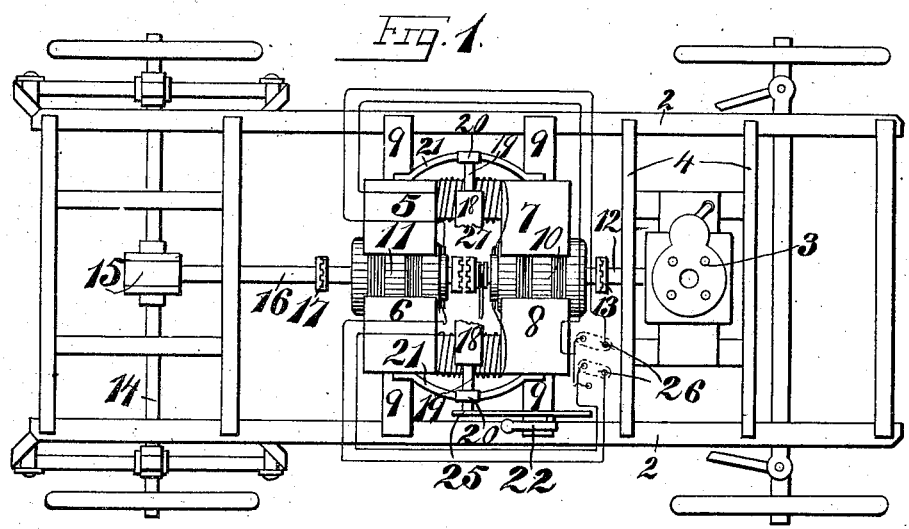

No. 894,800. PATENTED JULY 28, 1908.
J. SACHS.
POWER TRANSLATING APPARATUS.
APPLICATION FILED JULY 2, 1904.

WITNESSES
Leopold Auer
Chas H. Smith

INVENTOR
Joseph Sachs
PER Harold Serrell
ATTY

UNITED STATES PATENT OFFICE.

JOSEPH SACHS, OF HARTFORD, CONNECTICUT.

POWER-TRANSLATING APPARATUS.

No. 894,800.      Specification of Letters Patent.      Patented July 28, 1908.

Original application filed September 19, 1903, Serial No. 173,801. Divided and this application filed July 2, 1904.
Serial No. 215,092.

To all whom it may concern:

Be it known that I, JOSEPH SACHS, a citizen of the United States of America, residing at Hartford, in the county of Hartford and State of Connecticut, have invented an Improvement in Power-Translating Apparatus, of which the following is a specification.

Heretofore dynamos have been driven by prime movers of various descriptions for generating electricity and supplying the same to electric motors coupled to devices and machines to be operated. Apparatus of this nature have been applied to motor vehicles to which my improved power translating apparatus is particularly applicable. Where hydro-carbon explosive engines have been employed as prime movers in motor vehicles it has been necessary, owing to the limited torque effect of the engine, to provide mechanical gearings in varying ratios, any of which might be connected at will to the engine shaft to produce an increased or decreased torque effect at the vehicle wheels with an inversely varying speed, and one of the objects of my invention is to provide a power translating apparatus applicable to motor vehicles or other devices for transmitting power from hydro-carbon explosive engines or other prime-movers and delivering the power with inversely variable torque and speed at the driving end without exceeding the limit of the energy output of the prime-mover, and devices whereby, if occasion demands, the vehicle may be driven directly from the prime mover.

In carrying out my invention I preferably unite in one unit, two armatures and a common magnetic field system having the functions of both an electric generator and an electric motor and by employing special means for controlling and regulating the magnetic flux through one or both armatures without the use of field resistances or series-parallel switches, I obtain a variation in speed and torque effect at the driving end as great as if each of the functions were developed in separate and individual machines. The armature or armatures in which the electric current is produced and those in which it is transformed into mechanical energy, may be magnetically in series with each other and with a field magnet.

In the series arrangement, which I prefer, the magnetic flux passes through the field magnet and both armatures successively, and is set up by a common field coil or coils. These coils are preferably series or compound connected but may be shunt connected or separately excited, and when once adjusted need not be varied manually to produce the variation in speed and torque at the motor end. With the magnetic series arrangement of armatures and field magnet I preferably employ a magnetic shunt of permeable material whose magnetic reluctance is less than that of the air-gap and cores of either armature and so arranged as to be adjustably movable towards or away from or in contact with the field magnet pole-pieces of either the generator or motor armatures. By placing this magnetic shunt across the poles of either armature the flux through the same will be decreased in the ratio of the magnetic conductors of the air-gap and core of that armature to the conductors of the magnetic shunt, and the total magnetic flux is increased by the lower reluctance due to the magnetic shunt thereby increasing the flux through the other armature. Therefore by magnetically shunting one armature its field is decreased while that of the other is increased and hence a drop in the voltage due to magnetically shunting the generator armature, causes an increased field and consequent increased torque at the motor end with a decreased voltage at the motor armature terminals.

In ordinary systems where there is an increased load put upon the motor, a decreased speed and a correspondingly decreased counter electro-motive force and an increased flow of current results, and there is, therefore, an increased load put upon the generator, and consequently upon the prime-mover. In my improved arrangement, there need be no increased load put upon the prime-mover when an increased load is put upon the motor and this is made possible by reducing the flux through the generator armature. This results in a corresponding lowering of the generated electro-motive force and a consequent further decrease in the motor armature speed until the desired current is obtained. At the same time the flux through the motor armature core has been increased due to a decrease in the magnetic reluctance of the field system by the shunting of the generator armature and also due to the increased current flow in the field magnet cores which is automatically increased with the increase of load and torque. Thus the increased current demanded by the increased torque is supplied at a lower generated electro-motive force, although necessarily the effective electro-motive force is greater. This varying of the electro-motive force in inverse proportion demanded by the increased load upon the motor determines and limits the watts demanded and also the load upon the engine which is the result desired.

It is apparent the dynamo electric machine herein described may serve as either a multi-armature generator or motor as well as a generator motor or motor generator, and the magnetic shunt regulating devices may or may not be employed when so used, as is set forth in Letters Patent No. 781968, granted to me February 7th, 1905, for dynamo electric machine of which the present case is a division.

Figure 2:
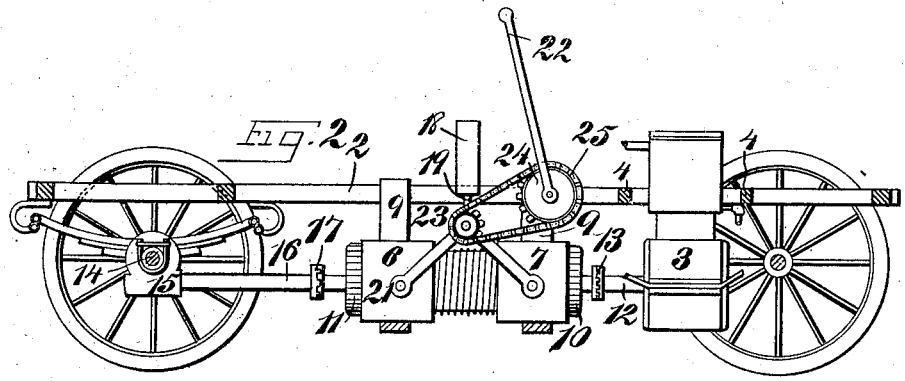

In the drawing, Figure 1 is a plan view showing the application of my improved power translating apparatus to a motor vehicle, and Fig. 2 is a longitudinal sectional elevation of the same.

Referring particularly to the drawing, 2 represents the frame of a motor vehicle: 3 represents a hydro-carbon or other engine suitably mounted upon supports 4 carried by the frame 2.

5, 6, 7 and 8 represent field poles of a dynamo-motor electric machine which is suitably mounted upon supports 9 also carried by the said frame 2.

10 represents a dynamo-armature operating between the field poles 7 and 8, and 11 is the motor armature operating between the field poles 5 and 6. The engine power shaft 12 is preferably connected to the dynamo-armature shaft by a clutch 13, and the drive-shaft 14 of the vehicle is preferably connected to the shaft of the motor armature through a differential gear 15, shaft 16 and clutch 17.

As shown and described in my application hereinbefore referred to in this form of apparatus I employ a bar 18 which is made of well annealed iron or other equally permeable material. This bar 18 is connected to arms 19 mounted in suitable bearings 20, carried by frames 21, which latter are secured to the sides of the machine. The bar 18 thus mounted is adapted to be moved toward, into contact with, or away from the field pole-pieces of either the dynamo or motor armature, and as illustrated, may be operated through the intervention of the lever 22, sprockets 23, 24, and a chain or other connection 25.

The dynamo and motor armatures are electrically connected in any desired manner, but preferably in series with each other and with the field circuits.

As illustrated in Fig. 1 the electric circuit may contain a switch 26 and the shafts of the motor and dynamo-armatures are normally disconnected, and the adjacent ends of the same are provided with the members of an interlocking clutch 27 or any other form of clutch known in the art adapted to connect said shafts in order that in case of necessity the engine may drive the vehicle directly through these shafts.

It will be understood that I do not limit myself to any particular form of either the electrical or mechanical devices for connecting the source of power to the driven member, nor do I limit myself to the means for delivering the variable speed and torque through the electrical devices, as many different arrangements are obviously available, and it will be apparent that the dynamo and motor may be separate machines, or embodied in one machine, and in either case the armature shafts may be in alinement or in any other relation to each other, as set forth in my application hereinbefore referred to, and also that the clutch for coupling the dynamo and motor armature shafts together may be of any well known type and operated in any desired manner.

I claim as my invention:

1. In a power translating apparatus, the combination with a prime mover and a driven member, of a generator armature, a motor armature, and means by which the shafts of said armatures may be connected whereby the driven member is always operated through the shaft of the motor armature.

2. In a power translating apparatus the combination with a prime mover, of a generator armature, a motor armature and a clutch by means of which the shafts of said armatures may be directly connected.

3. A power translating apparatus, comprising a prime-mover and a driven member, a generator armature, a motor armature, means for driving the shaft of the motor armature by the current supplied from the generator armature, and means for driving the motor armature through a direct mechanical connection with the generator armature shaft whereby the driven member is always operated through the shaft of the motor armature.

4. A power translating apparatus, comprising a prime-mover a driven member, an electric generator, an electric motor receiving current from said generator and means whereby the armature shafts of the said generator and motor may be coupled together whereby the driven member is always operated through the shaft of the electric motor.

5. The combination in a vehicle power translating apparatus with a self-contained prime mover supported upon and for driving the vehicle, of electrical devices for transmitting power, a driven member actuated thereby and means whereby said driven member may be mechanically connected directly with the said prime-mover whereby the said driven member is always operated through the revoluble members of the electrical devices.

6. A vehicle power translating apparatus, comprising a self-contained prime mover supported upon and for driving the vehicle, a driven member, electrical devices for delivering power from the prime mover with variable speed and torque, and means for mechanically connecting the driven member directly to the said prime mover.

7. A power translating apparatus, comprising a prime mover, a driven member, electrical speed and torque varying mechanism between the prime-mover and the driven member a mechanical connection between the prime-mover and the driven member, means for interchangeably operating the driven member through either the electrical mechanism or the mechanical connection, and means for inversely controlling the speed and torque transmitted from the electrical mechanism to the driven member.

8. In a power translating apparatus, and in combination a generator armature, a motor armature, means for supplying the current from the generator armature to the motor armature, a driven member and means for connecting and disconnecting the shafts of said armatures whereby the driven member is always operated through the shaft of the motor armature.

9. A power translating apparatus, comprising a dynamo-armature, a motor armature, means for producing a magnetic field in said armatures, means for controlling the torque and speed output of the motor, and the volt and ampere output of the dynamo, and means for connecting the shafts of the said armatures together.

10. A power translating apparatus, comprising a dynamo-armature, a motor-armature, means for producing a magnetic field in said armatures, means for controlling the torque and speed output of the motor, and means for directly connecting the shafts of said armatures together.

11. In a power translating apparatus, the combination with a prime mover, of a generator armature, a motor armature, means for producing a magnetic flux through each of said armatures, means for controlling the magnetic flux through said armatures, and means for connecting the shafts of the armatures together.

12. In a power translating apparatus, the combination with a prime-mover, of a generator armature, a motor armature, means for producing a magnetic flux through said armatures, and a clutch for directly connecting the shafts of said armatures together.

13. The combination in a vehicle power translating apparatus with a self-contained prime mover supported upon and for driving the vehicle, of a driven member, means whereby the driven member may be actuated electrically, and means interchangeable with the aforesaid means whereby the driven member may be actuated mechanically and directly from the said prime-mover whereby the said driven member is always operated through the revoluble members of the means for actuating the same electrically.

14. The combination in a vehicle power translating apparatus with a self-contained source of power supported upon and for driving the vehicle, of a driven member, electrical means for operating the driven member by the source of power, and mechanical means for operating the driven member by the source of power whereby the driven member is always operated through the revoluble members of the electrical means for actuating the same.

15. In a power translating apparatus and in combination, a prime-mover, a driven member, means for producing an electric current and transforming said electric current into mechanical motion for driving the driven member from the prime-mover, and means whereby said driven member may be mechanically connected directly with the prime-mover whereby the said driven member is always operated through the revoluble members of the means for transforming the electrical current into mechanical motion.

16. In a power translating apparatus and in combination, a prime-mover, a driven member, means for producing an electric current and transforming said electric current into mechanical motion for driving the driven member from the prime-mover, and means interchangeable with the aforesaid means whereby the driven member may be actuated mechanically and directly from said prime-mover whereby the said driven member is always operated through the revoluble members of the means for transforming the electrical current into mechanical motion.

17. In a self-propelled vehicle, a prime mover, an electric generator driven thereby, an electric motor adapted to be driven by said generator, a member driven by said motor, and means for mechanically connecting said member to said prime mover whereby the member driven by the motor is always operated through the motor shaft.

18. In a self-propelled vehicle, a prime mover, an electric generator driven thereby, an electric motor adapted to be driven by said generator, and means for clutching the shaft of said motor to the shaft of said prime mover.

19. In a self-propelled vehicle, a prime mover, an electric generator having its movable member mounted on the shaft of said prime mover, an electric motor adapted to be driven by said generator and having its shaft in line with the shaft of the prime mover, means for clutching the motor shaft to the shaft of the prime mover, and a member driven by said motor shaft.

20. In a self-propelled vehicle, a prime mover, an electric generator driven thereby, an electric motor adapted to be driven by said generator, a member driven by said motor, means for controlling the speed of said motor, and means for clutching said motor to said prime mover whereby the member driven is always operated through the shaft of said motor.

21. In combination, an electric dynamo, and an electric motor, whose revolving parts rotate about axes in alinement, and means for interlocking said parts so that they rotate together, substantially as described.

22. In combination, an electric dynamo, and an electric motor having their armatures mounted in axial alinement, and means for locking them together so as to rotate as one piece; with a prime mover for driving the dynamo, and a driven part actuated by the motor.

23. An electric dynamo, and an electric motor, having their revolving parts arranged in axial alinement, means for locking the motor and dynamo together to rotate as one and electrical connections between the dynamo and motor; with a prime mover actuating the dynamo, and a driven member actuated by the motor, substantially as described.

24. In combination, an electric generator, and an electric motor, whose revolving parts rotate in axial alinement, and means for interlocking said parts so that they rotate together; with a prime mover for driving the generator, and a driven part actuated by the motor when the dynamo and motor are not interlocked.

25. In combination, an electric dynamo, and an electric motor having their revolving parts mounted in axial alinement, and means for locking them together so as to rotate as one piece; with a prime mover for driving the dynamo, and a driven part actuated either by the motor, or by the prime mover when the dynamo and motor are interlocked.

26. An electric dynamo generator, and an electric motor, having their armatures arranged in axial alinement, electrical connections between the armature and motor and means for interlocking the dynamo and motor; with a prime mover actuating the dynamo, a driven member adapted to be actuated either by the motor or actuated direct by the prime mover when the motor and dynamo are interlocked, substantially as described.

27. In combination, a prime mover, a primary shaft driven thereby, a secondary shaft, a driven member operated therefrom, a dynamo operated from the primary shaft, an electric motor operatively connected with the secondary shaft, electrical connections between said dynamo and motor, and means for mechanically connecting the primary and secondary shafts, whereby the driven part is always operated through the shaft of said electric motor.

28. In combination, a prime mover, a primary shaft driven thereby, a secondary shaft, a driven member operated therefrom a dynamo operated from the primary shaft, an electric motor adapted to operate the secondary shaft, electrical connections between said dynamo and motor, and mechanism for locking the primary and secondary shafts together, whereby the driven part is always operated through the shaft of said electric motor.

29. In combination, a prime mover, and a dynamo having its armature shaft directly driven by said prime mover, an electrical motor having its armature shaft in axial alinement with the dynamo armature shaft, electrical connections between the dynamo and motor, a controller interposed in said connections, a driven member operated from the motor armature shaft, a clutch whereby the dynamo and motor shaft may be interlocked, and means whereby the electrical circuits are opened when said shafts are interlocked, substantially as described.

30. A driving and speed-changing mechanism for motor vehicles involving a motor, a dynamo comprising a stationary inductor and an armature fixed on the shaft of the motor, a driven shaft, an electric motor comprising a fixed inductor and an armature fixed on the driven shaft, a controller in the electrical circuit between the dynamo and the electric motor, and a clutching device for directly connecting the armature of the electric motor with the armature of the dynamo.

31. The combination with a driving shaft and an engine for operating the same, of an electric generator operatively connected to the engine, an electric motor electrically connected to the generator and having an armature shaft rotatable independently of said driving shaft, a driven member and means for connecting said shafts together whereby the driven member is always operated through the shaft of the electric motor.

32. The combination with a driving shaft and an engine for operating the same, of an electric generator operatively connected to the engine, an electric motor electrically connected to the generator and having an armature shaft rotatable independently of said driving shaft and operatively connected to the mechanism which is to be driven, and means for connecting said driving shaft to said mechanism whereby the mechanism to be driven is always operated through the shaft of the electric motor.

33. The combination with an engine and an electric generator operated thereby, of a driving shaft operatively connected to the engine, an electric motor electrically connected to said generator and having a shaft operatively connected to the mechanism which is to be driven, and a clutch for connecting said driving shaft to said mechanism whereby the said mechanism to be driven is always operated through the shaft of the electric motor.

34. The combination with an engine and a driving shaft operatively connected thereto, of an electric motor having a shaft operatively connected to the mechanism which is to be driven and a clutch for directly connecting said shafts together.

Signed by me this 30th day of June, 1904.

JOSEPH SACHS.

Witnesses:
JAS. C. HOWELL,
FRANK I. RENTICE.